Sept. 12, 1933.    J. M. DUNLEA    1,926,583
DRIFT INDICATOR FOR AIRCRAFT
Filed Aug. 24, 1926
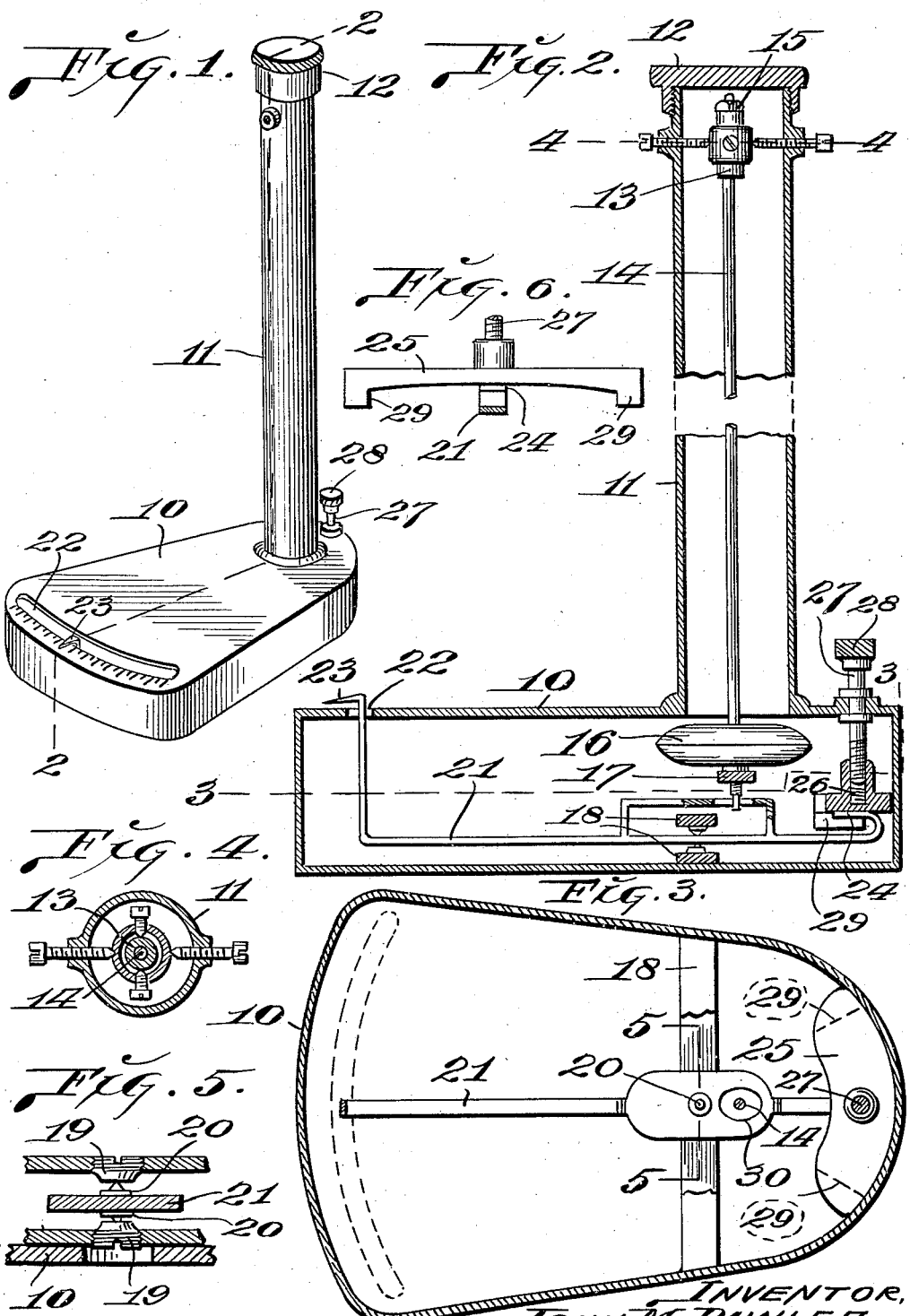

Patented Sept. 12, 1933

1,926,583

UNITED STATES PATENT OFFICE 1,926,583

DRIFT INDICATOR FOR AIRCRAFT

John M. Dunlea, Los Angeles, Calif., assignor of one-fourth to I. Denwitt, Los Angeles, Calif.; Dorothea Dunlea administratrix of said John M. Dunlea, deceased Application August 24, 1926. Serial No. 131,162

2 Claims. (Cl. 73—151)

My invention relates to an instrument that will automatically indicate the drift of air craft during flight, the principal objects of my invention being to generally improve upon and simplify the construction of the existing forms of similar instruments and to provide an indicator of the character referred to that will be positive and accurate in operation, inexpensive of manufacture and very effective in performing the functions for which it is intended.

Insofar as I am aware, the instruments heretofore utilized for indicating the drift of air craft when acted upon by the force of the wind, have depended for their operation, by the observing of the direction of travel of the air craft over the ground. Such devices, however are useful only in fair weather, good visibility and low altitudes; but such instruments are of no use in storms, mist, clouds, or while the craft is flying at night or over unknown land and oceans.

My indicating device is serviceable and functions at all times inasmuch as it depends for its indications on the results of the various movements of the craft on which it is mounted. Thus, in calm weather when there is no wind, the craft will move in the direction in which it is steered or headed. However, there are nearly always wind and air currents acting on air craft while in flight and the direction in which the craft moves, is the resultant of the velocities caused by the thrust of the propellor and that of the wind or air currents.

My improved instrument embodies the principles of a pendulum or free moving body that is suspended from a support that is movable in a horizontal plane and whose velocity or direction of movement is subject to change. The pendulous body having a sensible amount of weight, will by reason of inertia, either accelerate or retard in its movement relative to its support, and I propose to utilize this accelerating or retarding movement in actuating an indicating member that cooperates with a scale, preferably graduated, so as to indicate the drift of the air craft with which the instrument is associated.

With the foregoing and other objects in view, my invention consists in certain novel features of construction and arrangement of parts that will hereinafter be more fully described and claimed and illustrated in the accompanying drawing, in which—

Fig. 1 is a perspective view of a drift indicating instrument embodying the principles of my invention.

Fig. 2 is an enlarged vertical section taken approximately on the line 2—2 of Fig. 1.

Fig. 3 is a horizontal section taken on the line 3—3 of Fig. 2.

Fig. 4 is a horizontal section taken on the line 4—4 of Fig. 2.

Fig. 5 is an enlarged horizontal section taken approximately on the line 5—5 of Fig. 3.

Fig. 6 is an elevational view looking against the front edge of an adjustable plate that is utilized for damping the movement of the pointer of my improved instrument.

Referring by numerals to the accompanying drawing, which illustrates a practical embodiment of my invention, 10 designates an elongated horizontally disposed housing that is preferably formed of suitable sheet metal and secured to and projecting upwardly from the rear portion of this housing is a tubular member 11, the upper end of which is closed by a screw cap 12.

Suitably supported by a universal joint or bearing in the upper portion of tube 11 is a short sleeve 13 through which passes the upper portion of a rod 14 and that end of the rod that projects above sleeve 13 is threaded in order to receive a nut 15, thus enabling the rod to be adjusted vertically relative to the sleeve 13. The lower portion of rod 14 extends downwardly into the housing 10 and carries a weight 16, preferably a horizontally disposed disk. A portion of the rod 14 below this disk is threaded and receives a nut 17 and which latter, when manipulated, raises or lowers the disk on said rod.

Arranged transversely in the lower portion of housing 10 is a pair of bars 18 spaced a slight distance apart and adjustably seated in the central portions of these bars are bearings 19 for points 20, which latter are secured to and constitute an axis for a horizontally disposed arm 21. In order to minimize friction of the bearing comprising the points 20 and bearing members 19, I prefer to use bearings that are similar to the "jewel" bearings in watches and other time pieces.

The forward portion of arm 21 is bent upward and extends through an arcuate slot 22 that is formed in the top of housing 10, said slot being concentric with the axis or bearing of arm 21 and the end of the upwardly bent portion of said arm 21 terminates in a short pointer 23 that overlies the edge of the top plate of housing 10 directly in front of the slot 22. A graduated scale is formed on the surface of the top member of housing 10 directly in front of slot 22.

The rear portion of arm 21 is bent upwardly and thence backwardly to form a relatively short horizontally disposed spring arm 24 that is adapted to make light frictional contact with a metal plate 25 that is positioned within housing 10. The central portion of this plate 25 is provided with a vertically disposed threaded aperture 26 that receives the threaded lower portion of a short vertically disposed shaft 27, the latter having bearing in the top plate of housing 10 and the upper end of said shaft carrying a milled head 28. By rotating shaft 27 the engagement of the threaded lower portion thereof in the threaded recess 26 will raise or lower plate 25, thereby increasing or decreasing the degree of frictional contact between spring 24 and the under surface of plate 25.

Formed on the ends of plate 25 are depending lugs or pins 29 that function as stops against which the spring 25 is adapted to engage, thereby limiting the swinging movement of the arm 21.

A portion of arm 21 immediately to the rear of its axis is provided with an aperture 30 which may be of any desired shape, although I prefer to form this aperture so that it has a continuous curved edge. In the present instance, I have shown this aperture as being in the form of an oval with its major axis parallel with the axis of arm 21. The lower end of rod 14 projects into this aperture 30, and under normal conditions or while arm 21 occupies a central or neutral position with the pointer 23 adjacent to the zero mark on the graduated scale and the pendulum occupies a true vertical position, the lower end of rod 14 occupies a central position in aperture 30 as illustrated in Figs. 2 and 3.

When my improved instrument is applied to an airplane, or other aircraft, it is mounted on a fixed base, so that housing 10 occupies a horizontal position and tubular member 11, a vertical position. The pendulum comprising rod 14 and weight 16, being suspended by a universal joint at the top of member 11, will maintain its true vertical position, or substantially so as long as the aircraft is moving forwardly, without appreciable change of speed or direction, but said pendulum will respond by swinging, as a result of change in the horizontal velocity of the craft relative to its longitudinal axis. Thus, should wind or air currents exert sufficient pressure on the left hand side of the aircraft to move the same toward the right hand, for instance, at ten miles per hour during the forward travel of the aircraft, the pendulum will, by reason of its inertia, lag or swing toward the left hand and when the lower end of the pendulum bears against the edge of the aperture 30 on the left hand side thereof, it will swing arm 21 upon its axis comprising the bearings 19 and 20, and thereby move the pointer over the right hand portion of the graduated scale and indicate thereon the drift or movement of the aircraft off its true or forward course.

Thus, the pressure of the pendulum on arm 21, moves the latter a distance proportionate to the swing of the pendulum and, as the swing of which latter is proportionate to the swing or drift of the plane, the pointer 23 at the forward end of the arm will approximately indicate on the graduated scale, the direction of drift of the plane.

The arm 21 and its parts may be made of relatively light material, such as aluminum, and thus said arm has a relatively small degree of inertia as compared to the heavily weighted pendulum. To prevent the arm from swinging too far in either direction as a result of a sudden movement, or application of pressure by the pendulum, I arrange the spring 24 at the rear end of the arm, which spring bears with a certain degree of friction on the smooth under surface of plate 25 and the position of which latter is regulated by means of the adjusting screw 27. The friction between the spring and plate is just sufficient to cause the arm to stop as the pressure of the pendulum on said arm is relieved, and after the arm and pointer have been moved to an indicating position as just described, they will retain such position for a short period of time, or until actuated by a subsequent movement or pressure of the pendulum.

In order to increase the friction between spring 24 and plate 25, as the pointer swings toward its extreme positions or limits of lateral movement, the underface of plate 25 may curve or decline gradually downward from the intermediate portion of said plate as illustrated in Fig. 6, and which arrangement naturally brings about a gradual retarding of the movement of the pointer as it shifts toward its extreme positions. Obviously, when such arrangement is employed, the graduations of the outer portions of the scale in front of slot 22 must be correspondingly spaced.

Aperture 30 is made slightly larger than that portion of the pendulum that projects through said aperture, in order that the pendulum may swing freely for a limited distance in all directions without affecting or moving the arm of the indicator. Thus, the air craft on which the instrument is mounted may roll or tilt slightly without affecting the position of the pointer.

Assuming that an air craft equipped with my improved indicator is flying due north. Neither a head or tail wind will materially affect the direction of travel of the craft. Under such conditions there would be no indication of any change on the instrument as the pendulum hangs freely and if the pendulum should move at all it would be either directly forward or rearward, thereby bearing on the forward or rear portion of aperture 30 in line with the axis of the arm without moving the latter upon its axis. Consequently the arm will remain at a neutral position and the pointer 23 will indicate zero upon the graduated scale.

Assuming that a wind of ten miles per hour comes from the north-west, it will cause the machine to drift ten miles toward the south-east during each hour of travel, or if the wind is blowing directly from the west, it will drift the craft ten miles east in an hour's time. Assuming the speed of the plane to be one hundred miles per hour, which is a common speed of planes, it would mean that the plane at the end of an hour would be ten miles east of its course.

By having the instrument properly calibrated the pointer 23 will approximately indicate the drift of the plane laterally in either direction and which action is brought about as herein described by the accelerating or retarding movements of the pendulum, and which acceleration or retarding movements of the pendulum are imparted to the arm 21, one end of which terminates in the pointer that traverses the graduated scale.

It will be understood that in my improved indicator the pendulum will move relative to its support and in the opposite direction to the accelerating forces, and in so doing, it will move the rotating member on its pivot and thus the pointer will swing in the opposite direction, thereby indicating the direction in which the craft is drifting.

The gist of my invention is the provision of means to indicate and retain on the indicator for short periods of time, the results of accelerations after the accelerating forces have ceased to act, the indicating means being the rotating member, a portion of which serves as a pointer that remains in position when moved by acceleration until again moved by subsequent acceleration.

For greater accuracy of operation, my improved instrument may be mounted on a support that is stabilized by a gyroscope.

It will be understood that minor changes in the size, form and construction of the various parts of my improved air craft drift and direction indicator may be made and substituted for those herein shown and described without departing from the spirit of the invention, the scope of which is shown in the appended claims.

I claim as my invention:

1. In a drift indicator for aircraft, a pendulous member mounted to swing freely in all directions by forces of acceleration, a pivotally mounted member arranged to swing on a vertical axis below said pendulous member for indicating the movement of the latter there being an operative connection between said pendulous member and pivotally mounted member such that said pendulous member may move for a limited distance in any direction before engaging and imparting movement to said pivotally mounted member.

2. In a drift indicator for aircraft, a pendulous member mounted to swing freely in all directions by forces of acceleration, a pivotally mounted member arranged to swing on a vertical axis below said pendulous member for indicating the movement of the latter, there being an operative connection between said pendulous member and pivotally mounted member such that said pendulous member may move for a limited distance in any direction before engaging and imparting movement to said pivotally mounted member and means for damping the movement of said pivotally mounted member and for gradually increasing the damping effect as said pivotally mounted member approaches the limits of its movement in both directions.

JOHN M. DUNLEA.